United States Patent
Peterson et al.

(10) Patent No.: US 10,710,607 B2
(45) Date of Patent: Jul. 14, 2020

(54) SYSTEMS AND METHODS FOR IDENTIFYING FIRST ROUTE TO DESTINATION AS INVOLVING LESS HUMAN DRIVING OF VEHICLE THAN SECOND ROUTE TO DESTINATION

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 63 days.

(21) Appl. No.: 15/894,584

(22) Filed: Feb. 12, 2018

(65) Prior Publication Data

US 2019/0248379 A1 Aug. 15, 2019

(51) Int. Cl.
*B60W 50/12* (2012.01)
*G05D 1/00* (2006.01)
*G05D 1/02* (2020.01)
*B60W 50/14* (2020.01)
*G01C 21/34* (2006.01)
*B60W 30/182* (2020.01)

(52) U.S. Cl.
CPC .......... *B60W 50/12* (2013.01); *B60W 50/14* (2013.01); *G05D 1/0088* (2013.01); *G05D 1/0285* (2013.01); *B60W 2050/146* (2013.01); *B60W 2556/50* (2020.02); *B60W 2556/55* (2020.02)

(58) Field of Classification Search
CPC ................. B60W 50/12; B60W 50/14; B60W 2550/402; B60W 2050/146; B60W 2550/404; G05D 1/0285; G05D 1/0088
USPC ............................................................ 701/25
See application file for complete search history.

(56) References Cited

U.S. PATENT DOCUMENTS

| 9,188,985 B1 * | 11/2015 | Hobbs ..................... G01C 21/34 |
| 9,970,615 B1 | 5/2018 | Cardillo et al. |
| 10,309,789 B2 | 6/2019 | Ramasamy |
| 2011/0143726 A1 | 6/2011 | Silva |

(Continued)

FOREIGN PATENT DOCUMENTS

| WO | WO-2017068897 A1 * | 4/2017 | .......... G08G 1/0969 |
| WO | 2018026603 A1 | 2/2018 | |

OTHER PUBLICATIONS

Russell Speight Vanblon, Ryan Charles Knudson, Timothy Winthrop Kingsbury, Roderick Echols, "Systems and Methods to Identify Directions Based on Use or Autonomous Vehicle Function", related U.S. Appl. No. 15/660,023. Non-Final Office Action dated Jun. 13, 2019.

(Continued)

*Primary Examiner* — Marthe Y Marc-Coleman
(74) *Attorney, Agent, or Firm* — John M. Rogitz; John L. Rogitz

(57) ABSTRACT

In one aspect, a device includes a processor and storage accessible to the processor. The storage includes instructions executable by the processor to access data associated with at least one road and, based on the data, identify a first route to a destination as involving less manual driving by a human driver than a second route to the destination. The instructions are also executable by the processor to output directions for an autonomous vehicle to follow the first route to the destination.

21 Claims, 9 Drawing Sheets

(56) References Cited

U.S. PATENT DOCUMENTS

| | | | |
|---|---|---|---|
| 2014/0026065 | A1 | 1/2014 | Wang |
| 2014/0309864 | A1 | 10/2014 | Ricci |
| 2016/0280236 | A1 | 9/2016 | Otsuka |
| 2017/0008523 | A1* | 1/2017 | Christensen ......... G05D 1/0061 |
| 2017/0219364 | A1 | 8/2017 | Lathrop et al. |
| 2017/0259832 | A1 | 9/2017 | Lathrop et al. |
| 2017/0301235 | A1 | 10/2017 | Endo |
| 2017/0314957 | A1 | 11/2017 | Mimura et al. |
| 2017/0370740 | A1 | 12/2017 | Nagy et al. |
| 2018/0100742 | A1 | 4/2018 | Greenwood et al. |
| 2018/0113460 | A1* | 4/2018 | Koda ................... G05D 1/0088 |
| 2018/0162387 | A1 | 6/2018 | Sung et al. |
| 2018/0237012 | A1 | 8/2018 | Jammoussi et al. |
| 2018/0252541 | A1 | 9/2018 | Kesting et al. |
| 2018/0259956 | A1 | 9/2018 | Kawamoto |
| 2018/0299281 | A1* | 10/2018 | Takashima ........... G08G 1/0969 |

OTHER PUBLICATIONS

Russell Speight Vanblon, Ryan Charles, Knudson, Timothy Winthrop Kingsbury, Roderick Echols, "Systems and Methods to Identify Directions Based on Use of Autonomous Vehicle Function", file history of related U.S. Appl. No. 15/660,023.

VanBlon et al., "Systems and Methods to Identify Directions Based on Use of Autonomous Vehicle Function", related U.S. Appl. No. 15/660,023, Applicant's response to Non-Final Office Action filed Sep. 4, 2019.

VanBlon et al., "Systems and Methods to Identify Directions Based on Use of Autonomous Vehicle Function", related U.S. Appl. No. 15/660,023, Applicant's response to Office Action filed Oct. 29, 2019.

VanBlon et al., "Systems and Methods to Identify Directions Based on Use of Autonomous Vehicle Function", related U.S. Appl. No. 15/660,023, Final Office Action dated Oct. 3, 2019.

Norton et al., "Responding to a Signal Indicating That an Autonomous Driving Feature Has Been Overriden by Alerting Plural Vehicles", file history of related U.S. Appl. No. 16/793,184, filed Feb. 18, 2020.

* cited by examiner

SYSTEMS AND METHODS FOR IDENTIFYING FIRST ROUTE TO DESTINATION AS INVOLVING LESS HUMAN DRIVING OF VEHICLE THAN SECOND ROUTE TO DESTINATION

BACKGROUND

Autonomous vehicles are becoming more and more prevalent in the marketplace. As recognized herein, there may be instances where manual driving may be preferable to autonomous driving since autonomous driving may not handle a given situation as well as a human driver manually driving the vehicle would be able to handle driving in the situation. However, as also recognized herein, users of autonomous vehicles often prefer to drive manually as least as possible despite any such situations that might exist. There are currently no adequate solutions to the foregoing computer-related, technological problem.

SUMMARY

Accordingly, in one aspect a device includes a processor and storage accessible to the processor. The storage includes instructions executable by the processor to access data associated with at least one road and, based on the data, identify a first route to a destination as involving less manual driving by a human driver than a second route to the destination. The instructions are also executable by the processor to output directions for an autonomous vehicle to follow the first route to the destination.

In another aspect, a method includes accessing data pertaining to at least one driving condition and identifying, based on the data, a first route to a destination that involves less manual driving by a human driver than a second route to the destination. The method also includes providing, based on the identifying, directions to the destination via the first route.

In yet another aspect, a computer readable storage medium includes instructions executable by a processor to access data pertaining to a first route to a destination and a second route to the destination, where the first route to the destination involves less manual driving by a human driver than the second route to the destination. The instructions are also executable by the processor to present first and second options on a graphical user interface (GUI) presented on a display, where the first and second options are respectively associated with the first and second routes. The first option is selectable to select the first route and the second option is selectable to select the second route. The GUI also indicates that the first route involves less manual driving than the second route.

In still another aspect, a first device includes a processor and storage accessible to the processor. The storage includes instructions executable by the processor to perform autonomous driving of a vehicle, identify a current driving condition for which manual driving rather than autonomous driving should be employed, and transmit data pertaining to the current driving condition to a second device different from the first device.

The details of present principles, both as to their structure and operation, can best be understood in reference to the accompanying drawings, in which like reference numerals refer to like parts, and in which:

DETAILED DESCRIPTION

Figure 1:
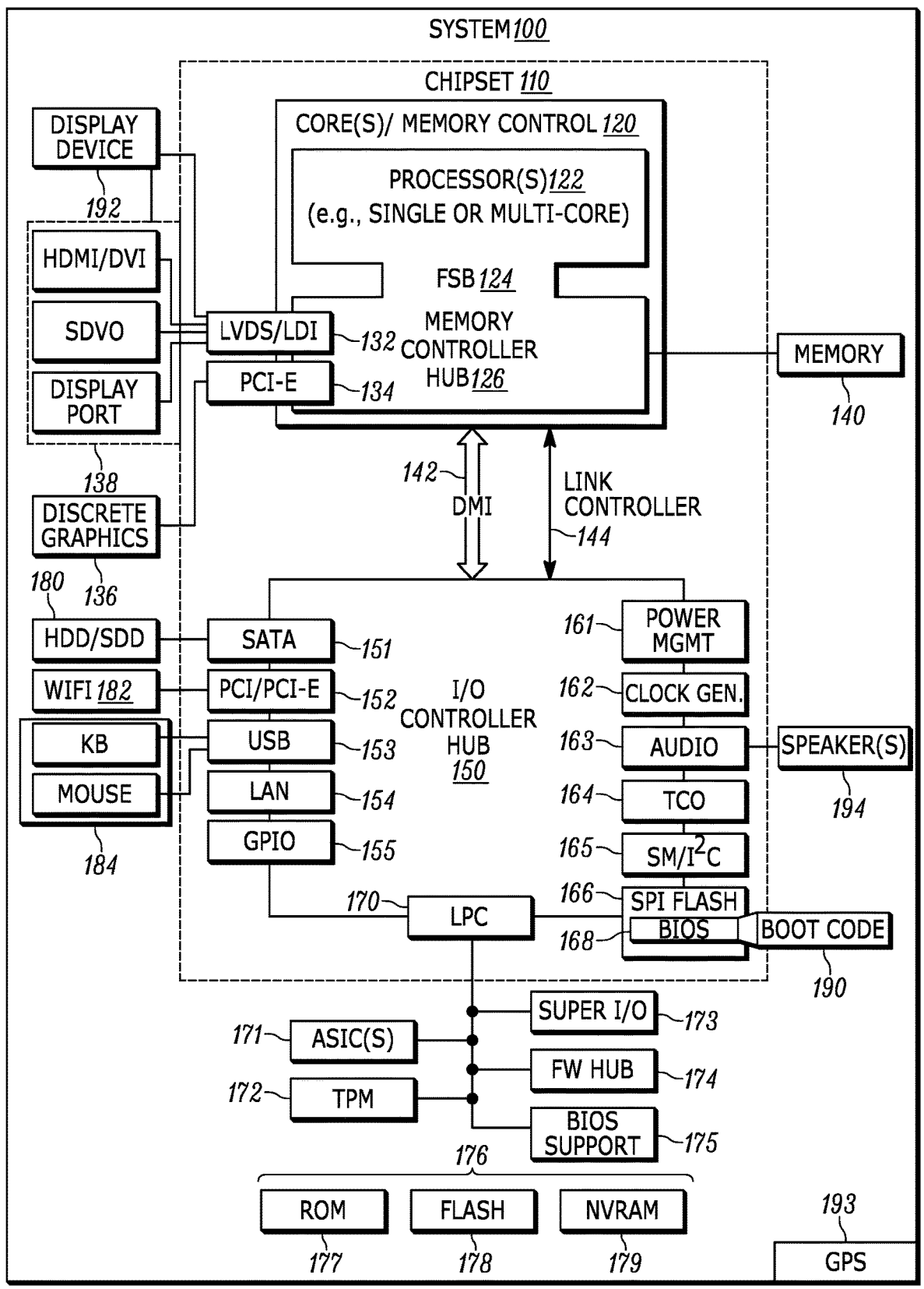
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any conventional general-purpose single- or multi-chip processor that can execute logic by means of various lines such as address lines, data lines, and control lines and registers and shift registers. Moreover, any logical blocks, modules, and circuits described herein can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case, the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may include a GPS transceiver 193 that is configured to communicate with at least one satellite to receive/identify geographic position information and provide the geographic position information to the processor 122 for navigating and following directions as disclosed herein. However, it is to be understood that another suitable position receiver other than a GPS receiver may be used in accordance with present principles to determine the location of the system 100.

Though not shown for clarity, it is to be understood that in some embodiments the system 100 may include still other components such as a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video.

It is to be understood that an example client device or other machine/computer may include fewer or more features than shown on the system 100 of FIG. 1. In any case, it is to be understood at least based on the foregoing that the system 100 is configured to undertake present principles.

Figures 2, 3:
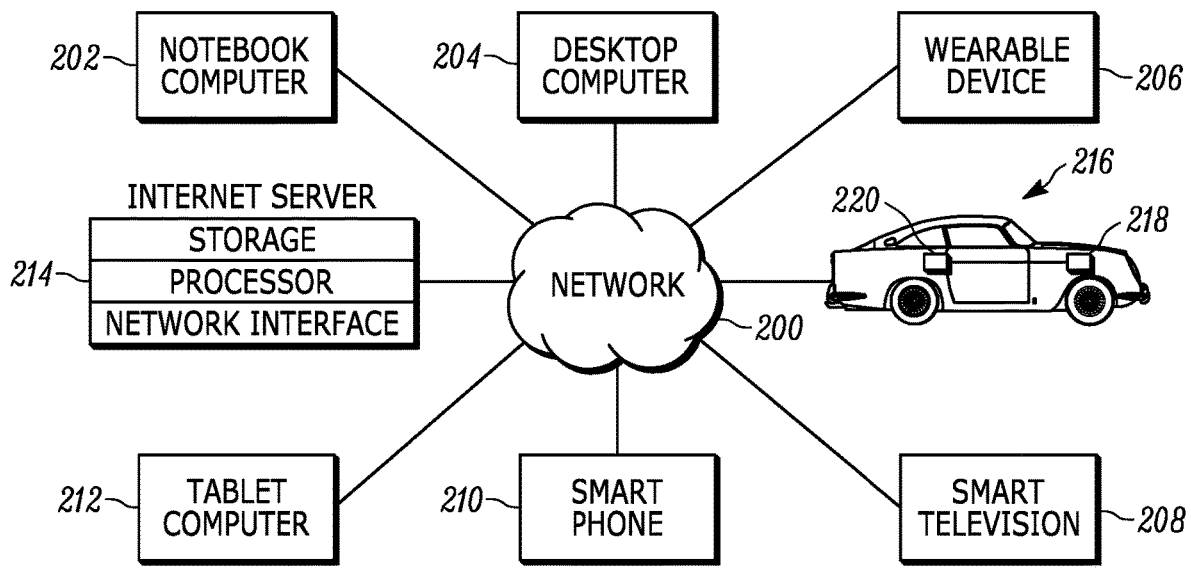
FIG. 2 is a block diagram of an example network of devices in accordance with present principles.
FIGS. 3-7 and 10 are example graphical user interfaces (GUIs) in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a vehicle 216, and a server 214 such as an Internet server that may provide cloud storage accessible to the devices 202-212, 216. It is to be understood that the devices 202-216 are configured to communicate with each other over the network 200 to undertake present principles.

Describing the vehicle 216 in greater detail, it may be an automobile such as a car or truck. The vehicle 216 may include one or more sensors 218 for sensing current driving conditions in accordance with present principles as set forth further below. For example, the sensor(s) 218 may include a camera, a water sensor, a humidity sensor, a temperature sensor, etc. The sensor(s) 218 may provide input to an on-board computer 220 of the vehicle 216 that has been programmed to perform autonomous driving of the vehicle 216 without a human driver controlling the steering, power, and/or braking mechanisms of the vehicle 216. However, note that the on-board computer 220 may still permit manual driving by the human driver for all or part of driving to a destination.

Regarding manual driving, it is to be understood in the context of the present application that "manual driving" may include a human driver controlling the steering, power, and/or braking mechanisms of the vehicle 216 to travel in the vehicle 216 using, e.g., a steering wheel, gas pedal, and brake pedal of the vehicle 216, even if the vehicle 218 has an automatic transmission.

FIGS. 3-7 will now be described. They are graphical user interfaces (GUIs) that are presentable on an on-board display of a vehicle such as the vehicle 216 in accordance with present principles. However, the GUIs shown in these figures may also be presented on the display of a personal/mobile device such as a smart phone or tablet computer that might be controlled by a user and be in communication with the vehicle's on-board computing system for outputting directions to the on-board computing system for the vehicle to follow the directions during autonomous driving.

Beginning with FIG. 3, a GUI 300 is shown. A user may provide text input to input box 302 of the GUI 300 by selecting it using touch input and inputting text using a hard or soft keyboard to indicate a destination to which the user would like to travel via an autonomous driving vehicle such as the vehicle 216. The GUI 300 may also include an option 304 that is selectable based on selection of check box 306 to provide input that the user wishes to be presented with one or more route options for traveling to the destination that have the least amount of potential manual driving involved so that the vehicle's self-driving/autonomous driving mode can be used and thus the user may spend the least amount of time as possible manually driving to the destination.

The GUI 300 also includes a submit selector 308. The selector 308 may be selected to transmit data via an Internet or other data connection that indicates the destination and that indicates whether the option 304 has been selected from the user's device (the device presenting the GUI 300). The data may be transmitted to another device such as a cloud server that will determine various possible routes and directions to the destination and ultimately output a response back to the user's device including directions for following the various possible routes. Thus, based on receipt of the data, the server may identify one or more routes to the destination using software similar to, e.g., Google Maps, Apple Maps, or another direction-assistance software program. Should the option 304 have been selected, the server may then also identify which one of the routes that it has identified involves the least amount of human driving and hence most amount of autonomous driving to the destination. Least manual driving/most autonomous driving may be defined in terms of less manual driving distance and/or less (estimated) manual driving time than other potential routes to the destination that the server has identified. In many instances, one of plural potential routes will satisfy both least manual driving distance and least estimated manual driving time. In instances where one route might satisfy least manual driving distance and a different route might satisfy least manual driving time, both routes and respective indications of least manual driving time or distance may be presented to the user for the user to select the one the user prefers.

Figure 4:
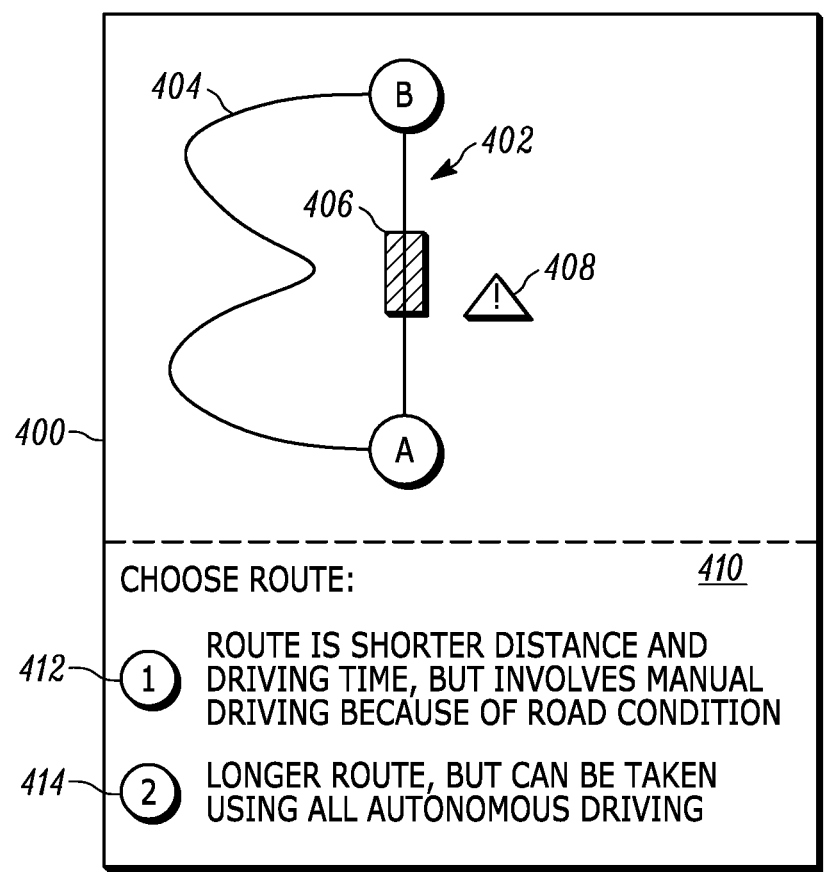

Before moving on to the description of FIG. 4, it is to be further understood that while a server may identify one or more potential routes as set forth above, in some embodiments the user's own personal mobile device and/or the autonomous vehicle on-board computer itself may also be capable of accessing map information and identifying such routes. In those embodiments, communication with a server for such purposes need not necessarily be performed. Additionally, note that the autonomous vehicle's on-board computer and/or the user's mobile device that might be wirelessly communicating with the on-board computer to provide the directions will be collectively referred to below as the "user's device" for simplicity even though one or both of those devices may be used.

Now describing FIG. 4, it shows a GUI 400 that may also be presented on a display controlled by the user's device responsive to receipt of the response that was output by the server (or user's device) that indicates a map and directions for the user and/or autonomous vehicle to follow along one or more potential routes to the user's destination. In turn, the directions (and also the notifications described below) may then be output by the user's own device via a display and/or speakers. Additionally, or alternatively, the directions may then be output to the autonomous vehicle for the vehicle to control its steering, power, and braking mechanisms to autonomously follow the directions to the destination.

As may be appreciated from FIG. 4, the GUI 400 indicates a first route 402 and a second route 404 from an origination point "A" to a destination point "B". Route 402 as presented on the GUI 400 also indicates that a section 406 of the route 402 involves manual driving rather than autonomous driving. A construction symbol 408 indicates the reason for this, namely, road construction through which the autonomous vehicle may not be capable of safely driving through or which laws might dictate that autonomous driving is not allowed. Though road construction is used in this example, it is to be understood that still other types of road sections might involve manual driving as well, such as roads that have insufficient mapping or have not been mapped at all, road sections designated as "school zones" owing to at least a portion of the road being adjacent to an elementary or high school, or road sections where police activity is currently occurring. The designations themselves may have been created based on data received from other users, government agencies, satellites, private companies etc.

The GUI 400 also includes a section 410 listing the routes 402 and 404. Selector 412 may be selected (e.g., based on touch or cursor input to the selector 412) to provide user input selecting route 402 as the route for the autonomous vehicle to follow even though the user will have to take over and drive manually for part of the route 402. As may also be appreciated from FIG. 4, the listing for route 402 indicates various information related to route 402, including that this route to the user's destination is a shorter distance and involves less driving time than the alternative route (route 404) but involves manual driving because of road construction along the route 402.

Selector 414 may be selected to provide user input selecting route 404 as the route for the autonomous vehicle to follow. As shown in FIG. 4, the listing for route 404 indicates various information related to route 404, including that this route to the user's destination has a longer distance and/or involves more driving time than the alternative route (route 402). However, the listing for route 404 also indicates that autonomous driving may be used for the duration of the route and hence the route 404 does not involve any manual driving on the part of the user.

Figure 5:
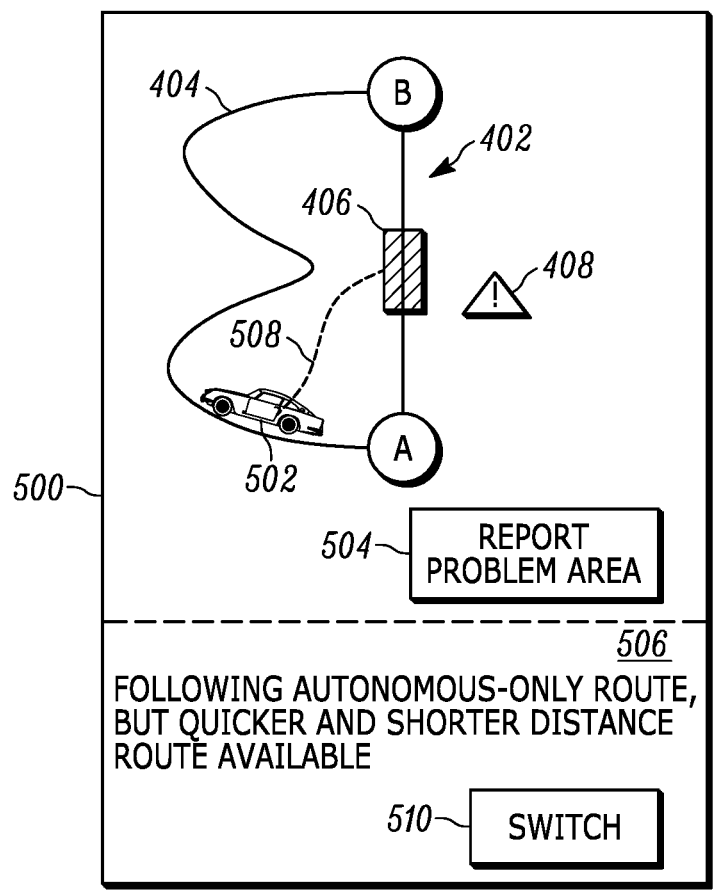

Turning now to FIG. 5, it shows a GUI 500 that may be presented on the display controlled by the user's device. The GUI 500 may initially be presented responsive to selection of one of the two routes from the listing shown in FIG. 4. The GUI 500 may track travel progress along the selected route, in this case route 404, and may update continually or periodically as the vehicle traverses the selected route. Thus, vehicle icon 502 represents the current location of the vehicle along the route and may progress along the route 404 shown on the GUI 500 as the vehicle itself progresses along the actual route in real life.

The GUI 500 may also include a selector 504 that is selectable to report a problem area on the route 404 to the server assisting in providing and updating the directions to the vehicle, and that might be providing and updating directions for others as well. A problem area might be an area having an adverse driving condition where a user might have to take over and perform manual driving, albeit unexpectedly. This may be owing to unexpected weather moving through the area that autonomous driving is not particularly suited for handling, based on unexpected defects in the road that autonomous driving is not particularly suited for handling, based on unexpected water or ice on the road that autonomous driving is not particularly suited for handling, etc.

The GUI 500 may also include a section 506 that indicates information related to the autonomous vehicle autonomously following the directions for traveling along the route to the user's destination. In this example, section 506 includes information indicating that the route is being followed that allows for autonomous-only driving as opposed to manual driving by the user. Section 506 also indicates that another route that is quicker and traverses less distance is also available. Part of this other route is reflected by perforated lines 508 that represent a detour back over to route 402. A selector 510 is also presented on the GUI 500, with the selector 510 being selectable to provide a command for the autonomous vehicle to begin autonomously driving the quicker, shorter route even though the user will have to take over and manually drive through part of it later.

Figure 6:
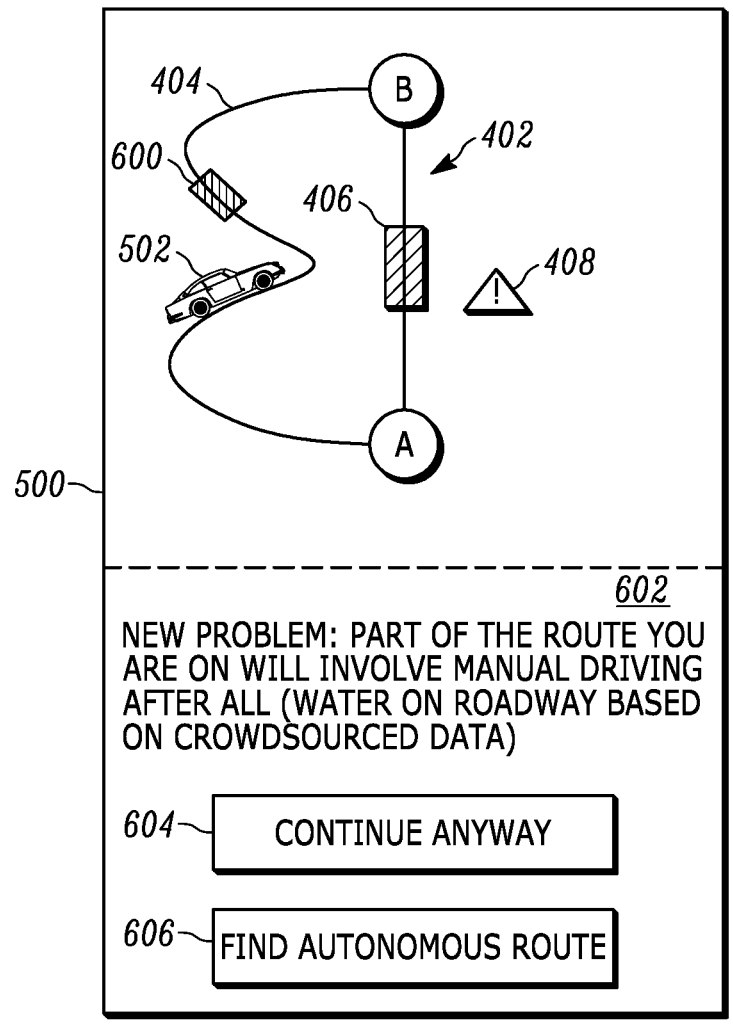

Continuing the detailed description in reference to FIG. 6, the GUI 500 that tracks travel progress along the selected route is again shown. For FIG. 6, assume the user did not select the selector 510 to switch routes but has instead chosen to remain on route 404. However, an unexpected problem area 600 as might have been recently identified by other people/autonomous vehicles is now shown on the GUI 500. The user's device may have been notified of existence of the area 600 after the user began traveling along the route 404, with the server in communication with the user's device notifying the user's device of its existence.

Thus, in FIG. 6 section 506 of the GUI 500 has been replaced with section 602. As shown, section 602 may include information indicating that a new "problem" has been identified in that part of the route 404 will now involve manual driving on the part of the user. Section 602 also indicates why that is the case, which in this example is that water is on the roadway as identified from crowdsourced data from others that have recently traveled through the area (e.g., within a threshold non-zero time prior to the current time).

Based on the unexpected road condition, the GUI 600 may also present selectors 604 and 606. Selector 604 may be selected (e.g., using touch or cursor input directed to it) for the user to provide a command for the user's device and/or autonomous vehicle to continue following the current route to the destination, which in this case is route 404. However, selector 606 may be selected for the user to provide a command for the user's device and/or autonomous vehicle, alone or using the server, to search for another route to the destination that allows for all autonomous driving so that the user may continue to refrain from any manually driving to get to the destination. Once any such new route is identified, it may be presented on the display controlled by the user's device and the autonomous vehicle may autonomously follow the new route.

Figure 7:
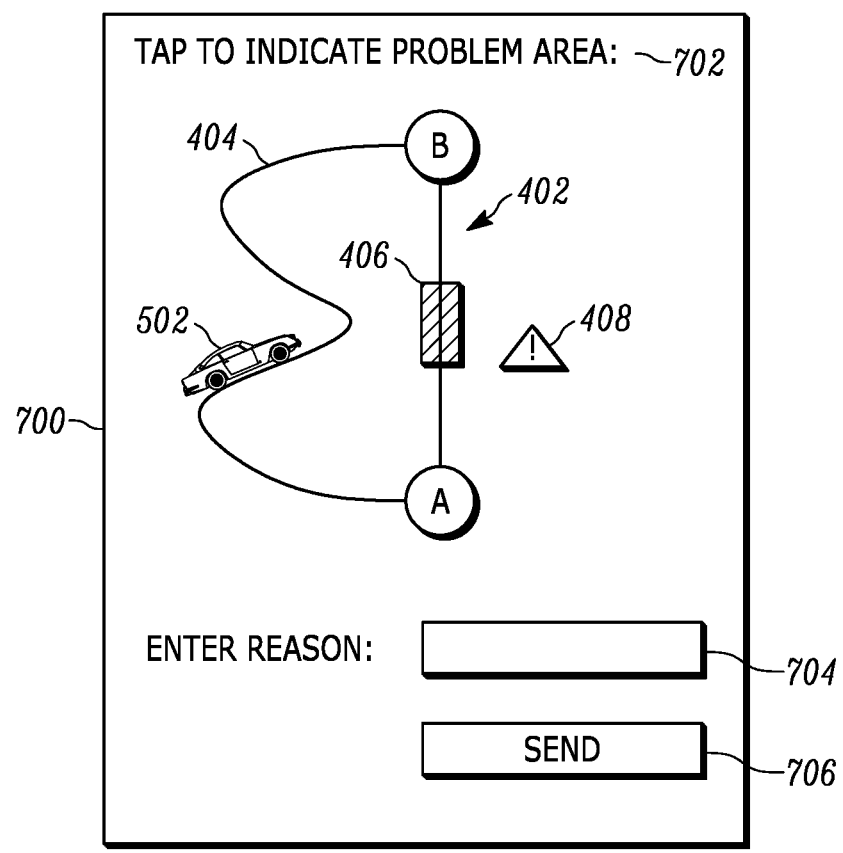

FIG. 7 shows yet another example GUI 700. The GUI 700 may be presented responsive to selection of selector 504 mentioned above so that a user can tag and report an unexpected problem area of a road along the route 404 through which manual driving is involved even though autonomous driving might otherwise be expected. The GUI 700 includes an instruction 702 to tap the area along the route 404 having the unexpected problem, which may be done using touch or cursor input to direct to the problem area as represented on the GUI 700. The user may even slide his or her finger or cursor from a starting position along the route 404 where the unexpected problem area begins to another position along the route 404 where the unexpected problem area ends to indicate the length of the unexpected problem area. The user may also direct text input to input box 704 by selecting it using touch input and then using a hard or soft keyboard to indicate the reason or cause of the unexpected problem area. Thereafter, the user may select the send selector 706 to transmit data indicating the unexpected problem area and the reason for it to the server so that other people that might also be letting their autonomous vehicle drive autonomously through the area can be notified by the server in advance of encountering the area themselves.

Figure 8:
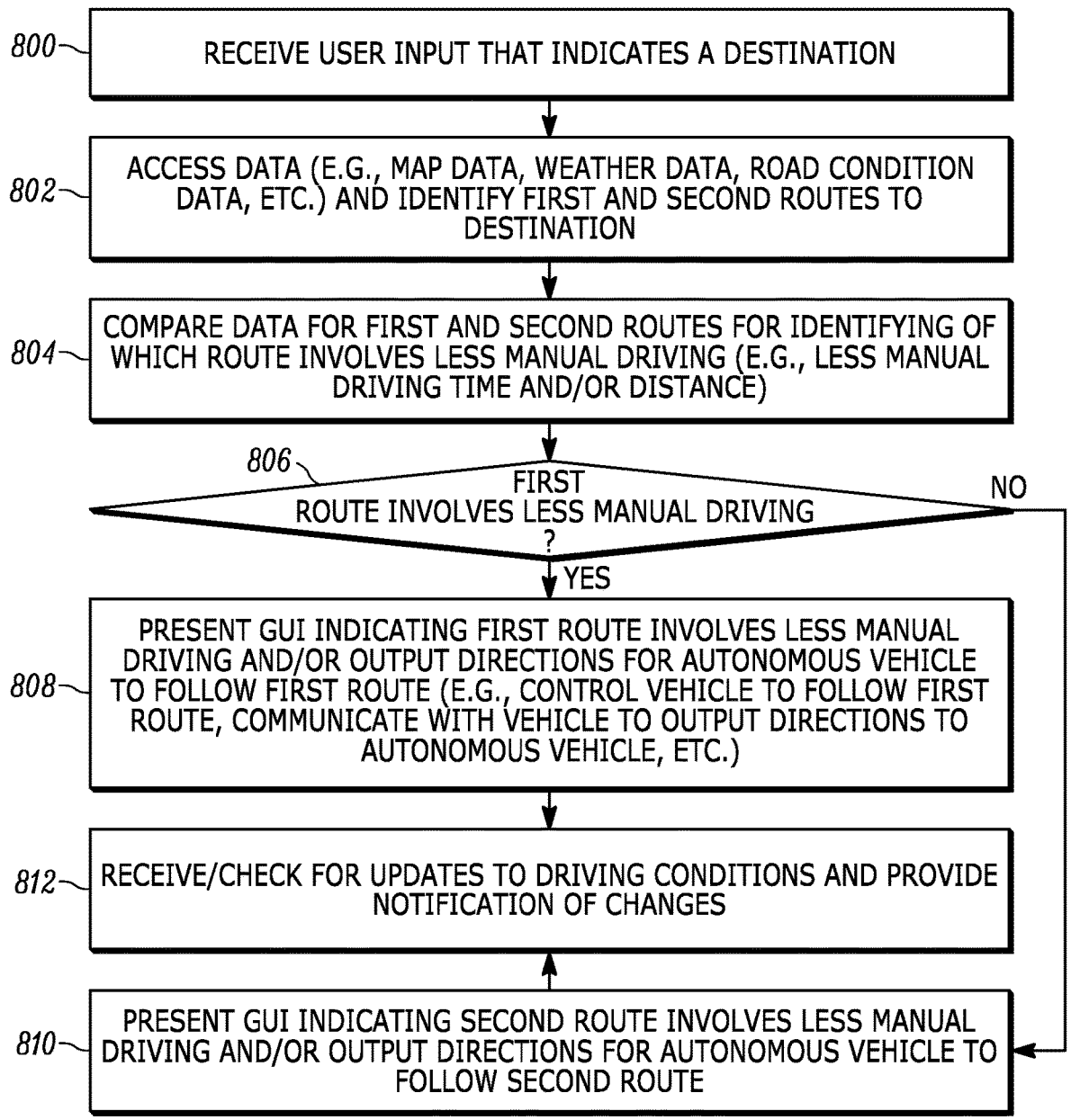
FIGS. 8 and 9 are flow charts of example algorithms in accordance with present principles.

Referring now to FIG. 8, it shows example logic in accordance with present principles that may be executed a device such as the server or the user's device described above. Beginning at block 800, the device may receive user input that indicates a destination, as described herein. The logic of FIG. 8 may then move to block 802 where the device may access data such as map data, weather data, road condition data, etc. using an Internet or other data connection, or access the data from local storage. Also, at block 802, based on accessing the data, the device may identify at least first and second routes as potential routes to the user's destination. Again, this may be done using a map application such as, e.g., Google Maps or Apple Maps.

From block 802 the logic may then proceed to block 804. At block 804 the device may compare data for the first and second routes to identify which route involves less manual driving by the user. For example, at block 804 the device may add up the total distance of manual driving that is expected on each of the routes, as might have been indicated in or determined from the data accessed at block 802, whether it be for one or multiple separate areas that involve manual driving along the given route. The device may then compare the total distance of expected manual driving for each of the routes to identify which route has less total manual driving distance.

As another example, at block 804 the device may add up the total predicted time of manual driving that is expected on each of the routes, as might have also been indicated in or determined from the data accessed at block 802, whether it be for one or multiple areas that involve manual driving along the given route. The device may then compare the total times of expected manual driving for each of the routes to identify which route has less total manual driving time.

From block 804 the logic of FIG. 8 may then proceed to decision diamond 806. At diamond 806 the device may determine, based on the comparison at block 804, whether the first route involves less manual driving than the second route. Responsive to an affirmative determination at diamond 806, the logic may proceed to block 808.

At block 808 the device may present a GUI for indicating that the first route involves less manual driving, such as a GUI similar to the GUI 400 described above. Additionally, or alternatively, at block 808 the device may automatically output directions for the autonomous vehicle to follow the first route, such as might be the case if the user has configured the device to automatically select the route involving less manual driving without first receiving user input selecting that route. The directions may be output by, e.g., providing commands controlling the autonomous vehicle to follow the directions for the first route and/or by communicating the directions for the first route to the autonomous vehicle via a data connection for the autonomous vehicle to then follow the directions. From block 808 the logic may then proceed to block 812, which will be described shortly.

But referring back to decision diamond 806, note that should a negative determination be made rather than an affirmative one, the logic may instead proceed to block 810. At block 810 the device may present a GUI for indicating that the second route involves less manual driving, such as a GUI similar to the GUI 400 described above. Additionally, or alternatively, at block 808 the device may automatically output directions for the autonomous vehicle to follow the second route, such as might be the case if the user has configured the device to automatically select the route involving less manual driving without first receiving user input selecting that route. Again, the directions may be output by, e.g., providing commands controlling the autonomous vehicle to follow the directions for the second route and/or by communicating the directions for the second route to the autonomous vehicle via a data connection for the autonomous vehicle to then follow the directions. From block 810 the logic may then proceed to block 812.

At block 812 the device may receive and/or check for updates to driving conditions, such as unexpected problem areas that have arisen. The updates may be received from other user devices that have reported the updates. Additionally, or alternatively, the updates may be received or accessed from a server that has already received the updates from the other user devices. Then, also at block 812, the device may, based on the updates, provide notifications of changes to driving conditions indicated in the updates. If the logic of FIG. 8 is being executed by a server, the notifications may include data transmissions provided to a user's device. If the logic of FIG. 8 is being executed by a user's device, the notifications may include graphical or audible notifications output by the user's device for observance by the user.

Figure 9:
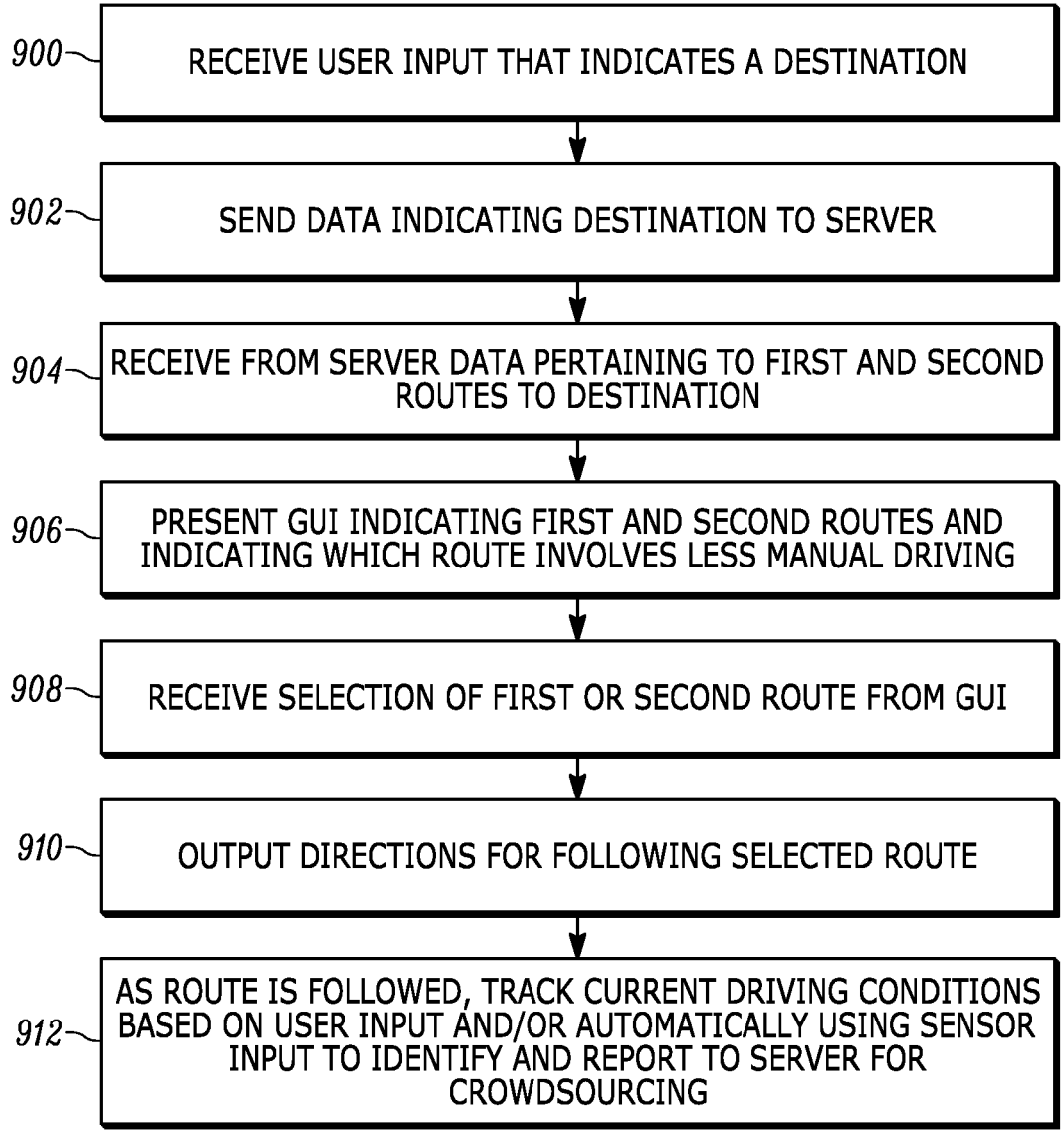

Now with reference to FIG. 9, it shows example logic that may be executed a user's device in accordance with present principles, whether that is an on-board computer of the user's autonomous vehicle or a mobile device in communication with the on-board computer. The logic of FIG. 9 may be executed in embodiments where a server rather than the user's device itself is to identify one or more routes to a destination and determine which one involves less manual driving. Beginning at block 900, the device may receive user input that indicates a destination, as described herein. The logic may then proceed to block 902 where the logic may transmit the data indicating the destination to a server that is to identify first and second routes to the destination.

From block 902 the logic may then proceed to block 904. At block 904 the device may receive back from the server data that details the first and second routes to the destination and which one involves less manual driving. Thereafter the logic may proceed to block 906 where the device may present a GUI (such as the GUI 400) indicating the first and second routes and also indicating which one involves less manual driving. From block 906 then logic may then proceed to block 908.

At block 908 the device may receive a selection from a user, based on input to the GUI, of either of the first route or the second route. Responsive to receipt of the selection, the logic may proceed to block 910 where the device may output directions for following the selected route. The directions may have been received from the server at block 904, and/or the directions may be received from the server as each step of the directions is followed.

The logic may then proceed from block 910 to block 912. At block 912 the device may, as the selected route is being followed, track current driving conditions of a given area along the route as the user's autonomous vehicle drives through the area. The driving conditions may be tracked based on user input to a GUI such as the GUI 700 described above.

Driving conditions may also be tracked based on input from one or more sensors disposed on the user's autonomous vehicle or otherwise in communication with the user's device/autonomous vehicle computer. For instance, the sensors may be or include a camera, a water sensor, a humidity sensor, a temperature sensor, etc. Various conditions can be sensed using those sensors, including certain weather conditions. E.g., a camera facing outward from the vehicle may be used to, by employing object recognition software, determine that excess water is on a portion of the roadway over which the vehicle is currently driving, thus identifying a water puddle or water-filled area of the roadway. Water and humidity sensors may also be used to determine whether input from those sensors indicates water above a threshold amount or concentration, which the user's device may also determine is indicative of excess water on the roadway.

The camera and object recognition software may also be used to determine that a current physical condition of the road is adverse, such as the painted lines on the roadway that delineate lanes and road boundaries being nonexistent, or too faint or worn out, for the autonomous vehicle's system to use to effectively and safely drive autonomously. A temperature sensor may also be used to determine weather conditions, such as whether input therefrom indicates temperature below a threshold amount (e.g. below 0 degrees Celsius), which the user's device may determine is indicative of ice potentially being on the roadway.

Still in reference to block 912, responsive to one or more adverse driving conditions being identified and/or responsive to the vehicle handing off control of the vehicle to the user for manually driving through such an area, the conditions may be reported to the server over an Internet or other data connection between the two so that the server can store that data and subsequently notify other vehicles that are being autonomously driven and are expected to encounter the same area. Additionally, or alternatively, the server can store and use that data to account for the adverse driving condition(s) when determining routes for other people that involve the least amount of manual driving as possible. Further, note that in some embodiments, if the adverse driving conditions were identified based on sensor input, the conditions may be reported to the server automatically responsive to their identification without receiving input from the user to report them.

Figure 10:
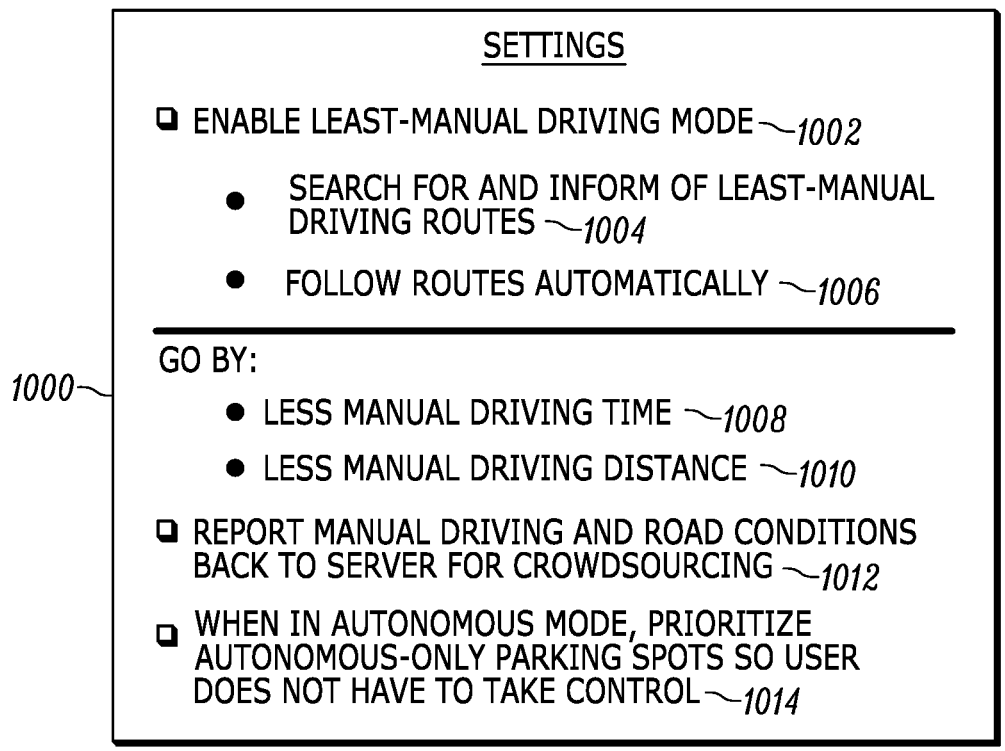

Continuing the detailed description in reference to FIG. 10, it shows an example settings GUI 1000 presentable on a display for configuring settings of a device undertaking present principles. For example, the GUI 1000 may be presented on an autonomous vehicle's on-board display controlled by the vehicle's on-board computer. The GUI 1000 may also be presented on the user's mobile device for configuring settings of an application that outputs directions for an autonomous vehicle's on-board computer to follow.

As shown in FIG. 10, the GUI 1000 may include a first option 1002 that is selectable by directing touch or cursor input to the check box shown adjacent to option 1002 to provide a command to the device that enables the device to identify and even automatically select/follow routes that involve the least amount of manual driving relative to other potential routes that have also been identified. Sub-options 1004 and 1006 may also be presented, with each one being selectable by directing input to the radio buttons shown adjacent to each one. Sub-option 1004 may be selected to enable the device to search for and inform the user of the least-manual driving route so that the user may then select it, should he or she choose to do so. Sub-option 1006 may be selected to enable the device to search for and automatically select and follow the least-manual driving route.

Additionally, the GUI 1000 may include still other sub-options 1008, 1010 associated with option 1002. Sub-option 1008 may be selected to enable the device to determine least-manual driving by estimated driving time, while sub-option 1010 may be selected to enable the device to determine least-manual driving by distance.

The GUI 1000 may indicate still other settings that may be configured. For instance, an option 1012 may be presented that is selectable to configure the device to tag and report instances where the autonomous vehicle cannot be autonomously driven (e.g., for some set or threshold amount of time) and passes off control to the user for manual driving based on one or more adverse road conditions.

An option 1014 may also be presented that is selectable to, while the vehicle is in autonomous driving mode in which it is autonomously driving itself, prioritize and select autonomous-friendly or autonomous-designated parking spaces so the user's involvement in parking the vehicle once a destination has been reached will not be requested by the vehicle. For instance, there may be available parking spaces that are closer to the user's destination than others, but the closer parking spots may be in a dirt parking lot or worn out parking lot area that does not have clearly distinguishable parking spot lines the autonomous vehicle would use to park itself. Hence, the autonomous vehicle may automatically select and autonomously park in a further spot with option 1014 being selected.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor; and
   storage accessible to the at least one processor and comprising instructions executable by the at least one processor to:
   access data associated with at least one road;
   based on the data, identify a first route to a destination as involving less manual driving by a human driver than a second route to the destination;
   output directions for an autonomous vehicle to follow the first route to the destination; and
   present a graphical user interface (GUI) on a display accessible to the at least one processor, the GUI comprising at least a first selector that is selectable by a user to command the first device to switch from outputting directions for the autonomous vehicle to follow the first route to the destination to outputting directions for the autonomous vehicle to follow a third route to the destination, wherein the third route comprises a detour back to at least a portion of the second route to the destination.

2. The first device of claim 1, comprising the autonomous vehicle.

3. The first device of claim 1, wherein the first device communicates with the autonomous vehicle to output the directions to the autonomous vehicle for the autonomous vehicle to autonomously drive at least partially to the destination.

4. The first device of claim 3, wherein the first device is established at least in part by one or more of: a mobile device, a server.

5. The first device of claim 1, wherein the first device accesses the data via a server with which the first device communicates, the server storing the data associated with one or more roads.

6. The first device of claim 1, wherein the first route is identified as involving less manual driving by the human driver than the second route without first receiving input from the human driver indicating that the first route involves less manual driving then the second route.

7. The first device of claim 1, wherein less manual driving is defined at least in part by less manual driving distance.

8. The first device of claim 1, wherein the GUI is a first GUI, and wherein the instructions are executable to:
   present a second GUI on the display, the second GUI being for configuring one or more settings related to autonomous driving, the second GUI comprising at least a first option that is selectable by a user a single time to enable the first device to, in the future, perform plural identifications of routes for presentation on the display that involve the least amount of manual driving relative to other potential routes.

9. The first device of claim 1, wherein the third route to the destination comprises at least a portion of the second route to the destination.

10. The first device of claim 1, wherein the GUI indicates that the third route comprises less driving time to the destination than the first route.

11. The first device of claim 1, wherein the GUI indicates that the third route comprises less driving distance to the destination than the first route.

12. The first device of claim 1, wherein the GUI indicates the third route with a non-text graphic.

13. A method, comprising:
    accessing data pertaining to at least one driving condition;
    identifying, based on the data, a first route to a destination that involves less manual driving by a human driver than a second route to the destination;
    providing, based on the identifying, directions to the destination via the first route; and
    presenting a graphical user interface (GUI) on a display, the GUI comprising at least a first selector that is selectable by a user to command a device to switch from providing directions to the destination via the first route to providing directions to the destination via a third route different from the first route, wherein the third route comprises a detour back to at least a portion of the second route to the destination.

14. The method of claim 13, wherein providing the directions comprises controlling an autonomous vehicle's steering mechanism to follow the first route.

15. The method of claim 13, wherein providing the directions comprises communicating the directions from the device to an autonomous vehicle different from the device.

16. The method of claim 13, wherein less manual driving is defined at least in part by less manual driving distance.

17. The method of claim 13, comprising:
    identifying, based on the data and based on selection of an option presented on the display, the first route to the destination, wherein the option is selectable to provide input to the device to present one or more route options on the display that have the least amount of potential manual driving involved for traveling to the destination.

18. The method of claim 13, wherein the third route comprises at least a portion of the second route.

19. The method of claim 13, wherein the GUI is a first GUI, and wherein the method comprises:
    presenting a second GUI on the display, the second GUI comprising at least a first option that is selectable by a user a single time to enable the device to, in the future, perform plural identifications of routes for presentation on the display that involve less manual driving than other potential routes.

20. A computer readable storage medium (CRSM) that is not a transitory signal, the computer readable storage medium comprising instructions executable by at least one processor to:
    access data associated with at least one road;
    based on the data, identify a first route to a destination as involving less manual driving by a human driver than a second route to the destination;
    output directions for an autonomous vehicle to follow the first route to the destination; and
    present a graphical user interface (GUI) on a display accessible to the at least one processor, the GUI comprising at least a first selector that is selectable by a user to command the at least one processor to switch from outputting directions for the autonomous vehicle to follow the first route to the destination to outputting directions for the autonomous vehicle to follow a third route to the destination, wherein the third route comprises a detour back to at least a portion of the second route to the destination.

21. A first device, comprising:

at least one processor; and storage accessible to the at least one processor and comprising instructions executable by the at least one processor to:

access data associated with at least one road;

based on the data, identify a first route to a destination as involving less manual driving by a human driver than a second route to the destination;

output directions for an autonomous vehicle to follow the first route to the destination; and present a graphical user interface (GUI) on a display accessible to the at least one processor, the GUI comprising at least a first selector that is selectable by a user to command the at least one processor to switch from outputting directions for the autonomous vehicle to follow the first route to the destination to outputting directions for the autonomous vehicle to follow at least a portion of the second route to the destination via a detour from the first route back to at least part of the second route.

* * * * *